(12) United States Patent
Minamitani et al.

(10) Patent No.: US 6,972,954 B2
(45) Date of Patent: Dec. 6, 2005

(54) LIQUID COOLING SYSTEM AND PERSONAL COMPUTER USING THE SAME

(75) Inventors: Rintaro Minamitani, Tsukuba (JP);
Makoto Kitano, Tsuchiura (JP);
Noriyuki Ashiwake, Tsuchiura (JP);
Shigeo Ohashi, Tsuchiura (JP);
Yoshihiro Kondo, Chiyoda (JP);
Takashi Naganawa, Chiyoda (JP); Yuji Yoshitomi, Chiyoda (JP); Tsuyoshi Nakagawa, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/079,264

(22) Filed: Mar. 15, 2005

(65) Prior Publication Data

US 2005/0157466 A1 Jul. 21, 2005

Related U.S. Application Data

(63) Continuation of application No. 10/779,625, filed on Feb. 18, 2004, now Pat. No. 6,873,525, which is a continuation of application No. 09/921,927, filed on Aug. 6, 2001, now Pat. No. 6,697,253.

(30) Foreign Application Priority Data

Dec. 20, 2000 (JP) .............................. 2000-386261

(51) Int. Cl.[7] .............................................. G06F 1/20
(52) U.S. Cl. ................. 361/687; 361/700; 165/104.21; 174/15.2
(58) Field of Search .............................. 361/687, 688, 361/699, 700, 680–683; 165/80.1–80.5, 104, 165/185, 104.21, 104.25, 104.26, 104.27, 165/104.33, 905; 174/15.2–17 LF

(56) References Cited

U.S. PATENT DOCUMENTS

| | | | |
|---|---|---|---|
| 4,712,158 A | 12/1987 | Kikuchi et al. | |
| 4,846,264 A * | 7/1989 | Hata | 165/104.27 |
| 5,011,659 A * | 4/1991 | Culling | 420/582 |
| 5,017,246 A * | 5/1991 | Miyasaka et al. | 148/605 |
| 5,226,471 A | 7/1993 | Stefani | |
| 5,471,850 A * | 12/1995 | Cowans | 361/700 |
| 5,646,824 A | 7/1997 | Ohashi et al. | |
| 5,740,018 A | 4/1998 | Rumbut, Jr. | |
| 5,757,615 A | 5/1998 | Donahoe et al. | |
| 5,764,483 A | 6/1998 | Ohashi et al. | |
| 5,815,370 A | 9/1998 | Sutton | |
| 6,166,907 A | 12/2000 | Chien | |
| 6,493,226 B1 * | 12/2002 | Noguchi et al. | 361/700 |
| 6,510,052 B2 | 1/2003 | Ishikawa et al. | |
| 6,519,146 B2 * | 2/2003 | Nagashima et al. | 361/687 |
| 6,549,408 B2 * | 4/2003 | Berchowitz | 361/700 |
| 2002/0075652 A1 | 6/2002 | Berchowitz | |

FOREIGN PATENT DOCUMENTS

JP 64-84699 3/1989

(Continued)

*Primary Examiner*—Lisa Lea-Edmonds
(74) *Attorney, Agent, or Firm*—Antonelli, Terry, Stout and Kraus, LLP.

(57) ABSTRACT

A liquid cooling system which is utilizable in a personal computer includes a pump for supplying a cooling liquid; a heat receiving jacket supplied with the cooling liquid and positioned to receive heat generated from a heat generation body, a heat radiation pipe for radiating heat which is supplied by the cooling liquid passing through the heat receiving jacket, and a passage for circulating the cooling liquid passing through the heat radiation pipe into the pump. The heat radiation pipe is made of material having a corrosion resistance that is higher than that of the heat receiving jacket.

6 Claims, 2 Drawing Sheets

FOREIGN PATENT DOCUMENTS

| | | |
|---|---|---|
| JP | 2-244748 | 9/1990 |
| JP | 5-335454 | 12/1993 |
| JP | 6-097338 | 4/1994 |
| JP | 6-125188 | 5/1994 |
| JP | 6-266474 | 9/1994 |
| JP | 7-142886 | 6/1995 |
| JP | 7-286788 | 10/1995 |
| JP | 10-213370 | 8/1998 |

* cited by examiner

LIQUID COOLING SYSTEM AND PERSONAL COMPUTER USING THE SAME

CROSS REFERENCE TO RELATED APPLICATION

This is a continuation of U.S. application Ser. No. 10/779,625, filed Feb. 18, 2004 now U.S. Pat. No. 6,873,525, which is a continuation of U.S. application Ser. No. 09/921,927, filed Aug. 6, 2001, now U.S. Pat. No. 6,697,253, the subject matter of which is incorporated by reference herein.

BACKGROUND OF THE INVENTION

The present invention relates to a liquid cooling system, and, in particular, to a liquid cooling system that is suitable for use in an ultra-small and/or thin electronic device.

Semiconductor devices, that are used in electronic devices, such as a computer, etc., generate heat during their operation. In particular, high-integrated semiconductor devices, in recent years, have produced an increased amount of heat generation. Since the semiconductor devices will be damaged and incapable of functioning if the temperature thereof exceeds a certain value, cooling is necessary to prevent damage to semiconductor devices having a large amount of heat generation during use.

For cooling the semiconductor devices of an electronic apparatus, there are various known techniques, such as thermal conduction or air-cooling, or the use of a heat pipe, or liquid cooling.

Cooling by thermal conduction is achieved by using materials having a large thermal conductivity along the heat radiating route, extending from the semiconductor device to the outside of the electronic apparatus. This method has been suitable for a so-called compact electronic apparatus, in which eat generation is relatively small, such as a notebook-type personal computer.

With cooling by the use of forced air, an air blower or fan is provided inside the electronic apparatus, thereby achieving a cooling of the semiconductor device therein by forced circulation of air thereon. This method is adopted widely for the cooling of semiconductor devices having a higher amount of heat generation, and it also has been applied to a personal computer by making the air blower small and thin in size.

Cooling with the use of a heat pipe involves carrying heat out to the outside of the electronic apparatus by means of coolant enclosed within a pipe, as described in Japanese Patent Laying-Open NO. Hei 1-184699 (1989), and Japanese Patent Laying-Open No. Hei 2-244748 (1989), for example. With this method, since there is no part capable of consuming electric power therein, such as an air blower or fan, such a cooling device has good efficiency, i.e., it increases the cooling through thermal conduction. However, with this method, there is a limit to the amount of heat that can be transferred.

Cooling by means of a liquid coolant is suitable for the cooling of a semiconductor device which generates a large amount of heat, and such a cooling device is described, for example, in Japanese Patent Laying-Open No. Hei 5-1335454 (1993), Japanese Patent Laying-Open No. Hei 6-97338 (1994), Japanese Patent Laying-Open No. Hei 6-125188 (1994), and Japanese Patent Laying-Open No. Hei 10-2 13370 (1998). However, such a cooling system using a liquid coolant has been restricted as to its field of utilization, such as to a large-scale computer. This is because the cooling system using a liquid coolant requires a large number of parts, such as a pump, a pipe system, heat radiation fins, etc., which are used exclusively for cooling, and so the apparatus comes to be large in size. Thus, it is difficult to maintain a satisfactory reliability when using liquid for cooling compared to other methods. It is also one reason why, on the commercial market, no semiconductor device requiring such a high level of cooling employs a liquid coolant system, other than in the field of the large-scale computers.

A technique for adapting the liquid cooling to a small-sized apparatus, including a notebook-sized personal computer, is described in Japanese Patent Laying-Open No. Hei 6-266474 (1994). In this cooling device, a header attached onto the semiconductor device and a heat radiation pipe separately located from it are connected with each other by means of a flexible tube to form a cooling system, and cooling is obtained by causing liquid coolant to flow therethrough.

However, there has been a remarkable increase in the heat generation produced from semiconductor devices which are used in electronic devices, such as a personal computer, a server computer, a work station, etc., in recent years. In addition, there has been a demand for electronic devices, such as a notebook-type personal computer, to be ultra-small and thin in size as well. For cooling the semiconductor devices used in those devices, various cooling methods have been adopted, such as thermal conduction, air-cooling, and/or the use of a heat pipe, as mentioned previously, however, the capacity of such cooling is still insufficient.

Also, for applying a liquid cooling system, which has been conventionally used in a large-scaled computer, to those electronic devices that are ultra-small and thin in size, it is a necessary condition that the liquid cooling system itself be ultra-small and thin in size. With such a system, the amount of liquid coolant retained therein is remarkably small, such as about $1/10,000$. Because of the small amount of liquid coolant, the quality of the liquid coolant is easily lowered or degraded, even with a very small amount of elusion of corrosive ions from material that is in contact with the liquid coolant, which promotes corrosion in the heat receiving jacket and/or the heat radiation pipe, both of which are typically made of metal. Since leakage of the liquid coolant undesirably affects the function of the apparatus, this leakage must be suppressed, however, measures taken to avoid this problem have been insufficient, according to conventional techniques.

SUMMARY OF THE INVENTION

Accordingly, an object of the present invention is to provide a liquid cooling system which is suitable for cooling a semiconductor device or the like, of the type which is used in electronic devices that are ultra-small and thin in size, and which is also capable of suppressing any influence on the electronic device due to corrosion, thereby ensuring the dependability of the system as a whole, and further to provide a personal computer equipped therewith.

For solving such problems, as mentioned above, according to the present invention, the tendency for corrosion to occur can be controlled, thereby providing a system which is effectively protected from corrosion, even for a computer having a structure which is small and thin in size.

In more detail, the present invention provides a liquid cooling system having a pump for supplying cooling liquid; a heat receiving jacket being supplied with said cooling liquid and position to receive heat generated from a heat generation body; a heat radiation pipe for radiating heat which is supplied thereto by cooling liquid passing through said heat receiving jacket; and a passage for circulating the cooling liquid passing through said heat radiation pipe into said pump, wherein said heat radiation pipe is made of a material having a corrosion resistance that is higher than that of said heat receiving jacket. Further, it is possible to construct the heat receiving jacket so as to be surrounded by a waterproof sheet, thereby to improve the reliability thereof.

With the corrosion resistance mentioned above, consideration must be given to pitting corrosion with respect to ions dissolved in the cooling liquid (in particular, halogen group ions, such as fluorine, chlorine, etc., of organic matter, including rubber and plastics, dissolving from an area that is in contact with the liquid). As an example, the heat receiving jacket may be made of material, mainly containing aluminum as a constituent component thereof, while said heat radiation pipe is made of a stainless material. However, on the other hand, by taking the importance of the thermal conductivity thereof into consideration, although it lowers the characteristic of corrosion resistance from that mentioned above, it may be possible, for example, to make the heat receiving jacket of a material, mainly containing copper as a constituent component thereof, while the heat radiation pipe is made of a stainless material. As another example, though there may be a possibility of lowering the characteristic of corrosion resistance, it is also possible for the heat receiving jacket to be made of a material, mainly containing aluminum as a constituent component thereof, while the heat radiation pipe is made of a material, mainly containing copper as a constituent component thereof, from the same viewpoint as indicated above. However, in this case, it is preferable to take a countermeasure, such as, adding an anticorrosive agent and/or a corrosion inhibiter agent to the copper, from the viewpoint of the corrosion resistance thereof.

According to the present invention, the heat radiation pipe is made of a material having a corrosion resistance that is higher than that of the heat receiving jacket; and the thickness from the cooling liquid passage up to the surface of said jacket in the heat receiving jacket is greater than the thickness from the cooling liquid passage up to the surface of the heat radiation pipe in the heat radiation pipe.

Alternatively, it is also possible for the heat receiving jacket to be made of a material, mainly containing copper as a constituent component thereof, while the heat radiation pipe is also made of a material, mainly containing copper as a constituent component thereof. However, in this case, it is preferable to introduce a corrosion inhibiter agent into the material of the copper group, in addition thereto, from the viewpoint of increasing the inhibiting corrosion effect.

Alternatively, it is also possible for the heat receiving jacket to be made of a material, mainly containing aluminum as a constituent component thereof, while the heat radiation pipe is also made of a material, mainly containing aluminum as a constituent component thereof. However, in this case, it is preferable to introduce a corrosion inhibiter agent into the material of the aluminum group, in addition thereto, from the viewpoint of increasing the inhibiting corrosion effect.

And, more preferably, the present invention provides a personal computer including a semiconductor element, a signal input portion and a display device; and, further including a heat receiving jacket supplied with cooling liquid and position to receive heat generated from a heat generation body; a heat radiation pipe for radiating heat which is supplied by the cooling liquid passing through said heat receiving jacket; and a passage for circulating the cooling liquid passing through said heat radiation pipe into said pump, in addition to those features mentioned above.

As an example of a notebook-type personal computer, there is provided a personal computer having a main body including a semiconductor element and a signal input portion; a display device, having a display portion, connected with said main body through a movable mechanism; a pump for emitting cooling liquid; a heat receiving jacket disposed within said main body and supplied with said cooling liquid, said heat receiving jacket being positioned to receive heat generated within said semiconductor element; a heat radiation pipe disposed on a back surface of said display portion of said display device for radiating heat which is supplied by the cooling liquid passing through said heat receiving jacket; and a passage for circulating the cooling liquid passing through said heat radiation pipe into said pump. In more detail, the heat receiving jacket is made of a material, mainly containing copper as a constituent component thereof, while said heat radiation pipe is also made of a material, mainly containing copper as a constituent component thereof; and, the thickness from said cooling liquid passage up to the surface of said jacket in said heat receiving jacket is greater than the thickness from said cooling liquid passage up to the surface of said heat radiation pipe in said heat radiation pipe.

BRIEF DESCRIPTION OF THE DRAWINGS

Those and other features, objects and advantages of the present invention will become more apparent from the following description, when taken in conjunction with the accompanying drawings, wherein.

DETAILED DESCRIPTION OF THE INVENTION

Hereinafter, various embodiments according to the present invention will be fully explained with reference to the attached drawings.

Figure 1:
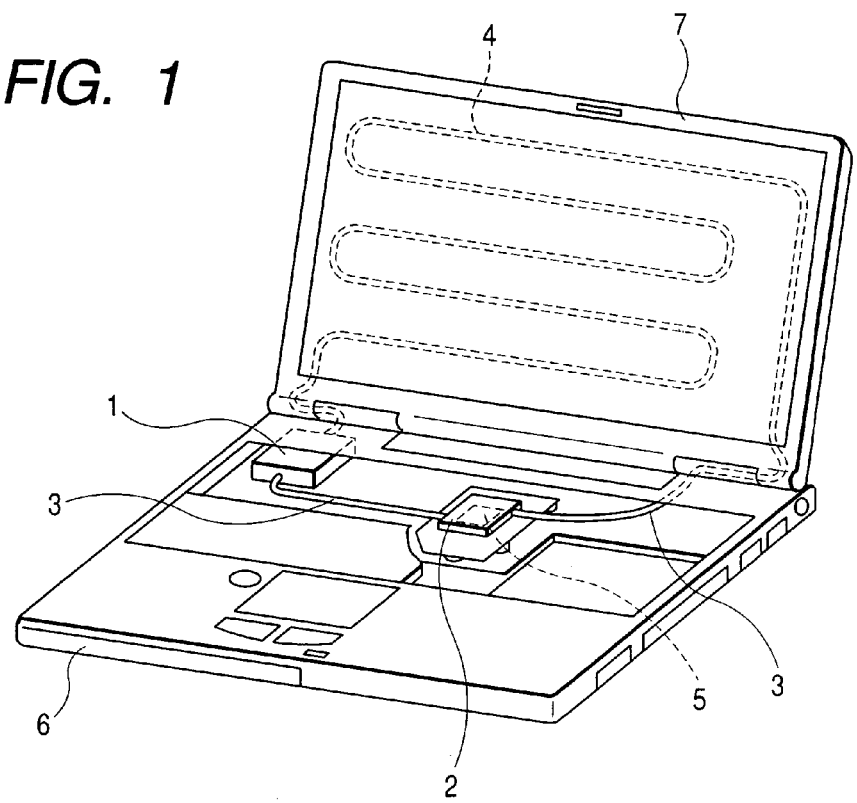
FIG. 1 is a perspective view of a notebook-type personal computer representing an embodiment of the present invention.

FIG. 1 shows a notebook-type personal computer using the liquid cooling system according to the present invention. To a semiconductor element or device 5 mounted on a circuit board forming a signal input portion within a main housing or chassis 6, there is connected a heat receiving jacket 2, in which a flow passage is provided. In the main housing 6, there is also provided a pump 1. Behind a display panel of a display device case or housing 7, there is provided a heat radiation pipe 4. The pump 1, the heat receiving jacket 2 and the heat radiation pipe 4 are connected with a connector pipe 3 in a closed loop-like manner to form a liquid cooling system, as shown in the figure, in which liquid coolant is circulated. The liquid coolant may be any coolant, including pure water. Basically, water can be used therein. Depending upon the case, it may be desirable to add a corrosion inhibiter agent or the like to the coolant.

Depending upon the size of the apparatus to which the liquid cooling system is to be applied, the amount of cooling liquid will vary and can be considered to he, for example, about from 5 cc to 10 cc in the case of a notebook-type personal computer, and about from 5 cc to 200 cc in the case of a desktop-type personal computer.

Figure 2:
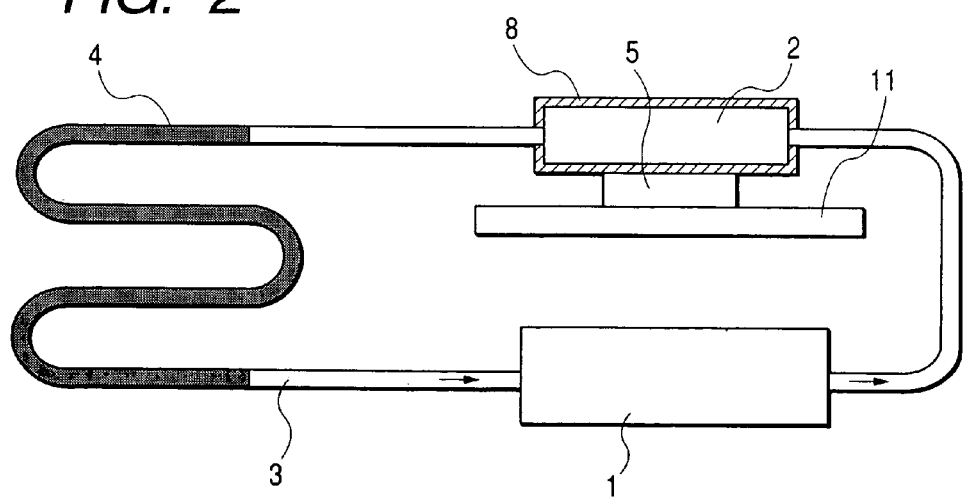
FIG. 2 is a schematic diagram of the embodiment of the present invention.

FIG. 2 diagrammatically shows a first embodiment of the liquid cooling system used in the notebook-type personal computer shown in the FIG. 1. The semiconductor element or device 5 is mounted on the circuit board 11. The heat radiation pipe 4 is made of a material that is superior in corrosion resistance compared to that of the heat receiving jacket 2. In the present embodiment, the heat receiving jacket 2 is enclosed by a waterproof sheet 8.

With this construction, the heat receiving jacket 2 is subjected to an increased amount of corrosion, which is higher than that in the heat radiation pipe 4, thereby allowing ions to be dissolved or melted into the cooling liquid from the rubber or plastic material, etc., which is in contact therewith in the heat receiving jacket 2, while at the same time suppressing corrosion of the heat radiation pipe 4. Since liquid leakage or the like due to pitting corrosion can be suppressed in the heat radiation pipe 4, which has a large area, it is sufficient to provide or take measures against only corrosion in the heat receiving jacket 2, which has a small area, therefore making it possible to obtain an effect against the corrosion of the system as a whole with a high efficiency.

Also, enclosing or covering the heat receiving jacket 2 by the waterproof sheet 8 further enables or enhances the prevention of leakage of water even when pitting corrosion extends through the material due to promotion of corrosion in the heat receiving jacket.

A case will be described wherein the material of the heat receiving jacket 2 is aluminum (a jacket cast with ADC material (for example, ADC12)) and the heat radiation pipe is a stainless pipe (using SUS304). Aluminum is suitable as the material of the heat receiving jacket from the viewpoint of thermal conductivity, workability in machining, and also the light weight character thereof. An oxidization film of $Al_2O_3$ is formed on the surface of aluminum in an atmosphere of a neutral pH region, thereby obtaining the property of corrosion resistance. On the other hand, stainless steel shows a superior property of corrosion resistance in fresh water due to the presence of a passivity film thereon. The amount of elution of Fe ions is small. Although the co-existence of different kinds of metals is not preferable from the viewpoint of corrosion resistance, in many cases, however, the influence by the ions liquefying from aluminum can be suppressed by the film on the surface of the stainless material. In addition thereto, as was mentioned previously, corrosion in the heat radiation pipe 4 can be suppressed through the function of the ions, as mentioned above, by producing a reaction of ions, such as a chloride or others, dissolved from the rubber and/or plastic material in contact with the cooling liquid in the heat receiving jacket 2.

Also, the thickness, from a liquid portion of the heat receiving jacket 2 up to the surface thereof, is greater than that of the heat radiation pipe 4, and this enables the heat receiving jacket 4 to perform thermal diffusion of heat received from a high-heat generation body, such as a semiconductor element or the like, with high efficiency, as well as, avoiding the likelihood that the pitting corrosion will reach the surface, even when corrosion occurs.

On the other hand, a case where the heat receiving jacket 2 is made of copper, while the heat radiation pipe 4 is made of a of stainless material, also can be employed in consideration of the importance of the thermal conductivity of the heat generation body, such as, a semiconductor element, etc. If the material is copper, though exhibiting a superior character of corrosion resistance in fresh water due to the oxidization coating film formed on the surface thereof, in the same manner as stainless steal, however, it liquefies out an amount of Cu ions much larger than that of stainless steel. Thus, it is preferable to provide a structure capable of prohibiting leakage of water in the form of a waterproof sheet, when the corrosion proceeds on aluminum due to Cu ions. And, it is also effective to add a corrosion inhibiter (for example, benzotriazol, mercapobenzothiazol, tolyltriazol, etc.) when using a material of the copper group, into the coolant in advance, thereby suppressing the elution of Cu ions.

Also, it is possible to use a heat radiation pipe made of copper, while using a heat receiving jacket made of aluminum. However, in this case, it is preferable to take preventive measures, such as, by adding a corrosion protection agent for copper, from the viewpoint of the corrosion resistance thereof.

Figure 3:
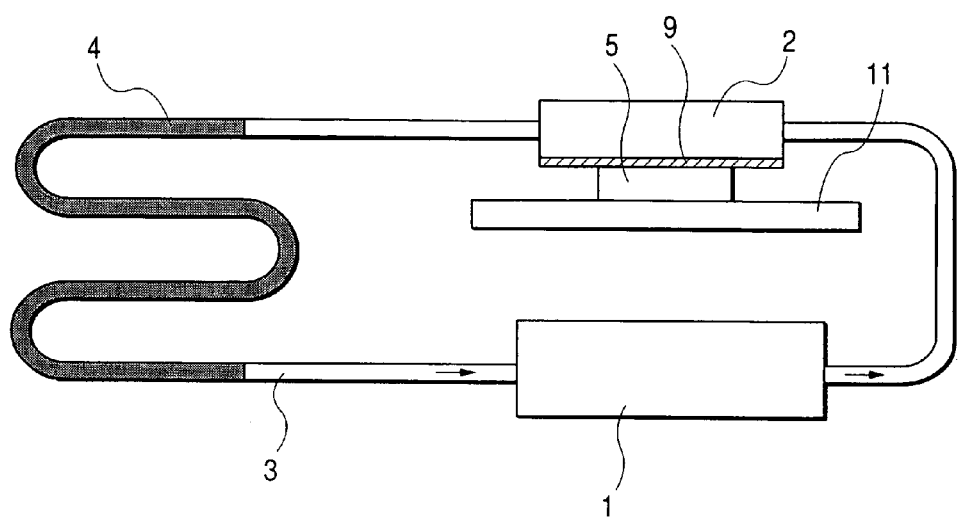
FIG. 3 is a schematic diagram of another embodiment of the present invention.

FIG. 3 diagrammatically shows another example of a cooling system for the notebook-type personal computer shown in FIG. 1. As shown in the FIG. 3, it is possible to construct the cooling system so that it comprises a thermal conductive sheet 9 of waterproof character between the heat receiving jacket 2 and the semiconductor element 5. For example, the heat receiving jacket may be made to be greater in thickness to the surface of the thermal conductive sheet, so as to inhibit the leakage of water therein. Further, it is effective, in particular, to apply the liquid cooling system to an apparatus having a semiconductor device of the type generating an amount of heat that is more than 30 W.

Figure 4:
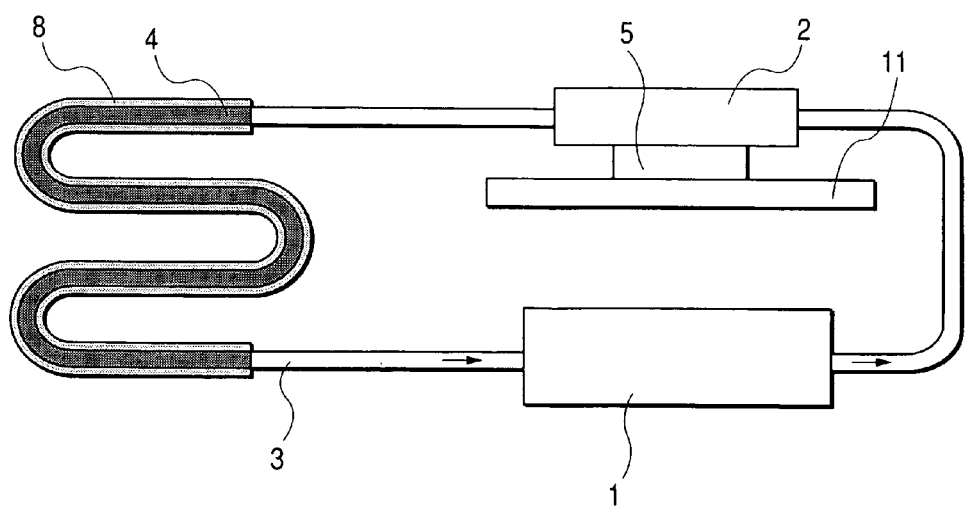
FIG. 4 is a schematic diagram of a still further embodiment of the present invention.

Other examples will be described hereinafter. In any one of them, the measures to be taken are simplified by identifying the portion where corrosion is greatest, thereby to improve the reliability of the system as a whole. FIG. 4 diagrammatically shows an example of a further embodiment of the present invention. The heat receiving jacket 2 in this embodiment is made of a material that has a superior corrosion resistance to that of the heat radiation pipe 4. In the present embodiment, the heat radiation pipe 4 is enclosed or covered by a waterproof sheet 8.

In this embodiment, attention to be paid to measures taken against corrosion is focused on the heat radiation pipe 4. With this feature, the leakage of water can be prevented by enclosing or coating the heat radiation pipe with the waterproof sheet 8, so that, even if pitting is formed to the extent that the promotion of corrosion penetrates through the material of the heat radiation pipe 4, there will be no leakage of water.

A case will be described in which the material of the heat radiation pipe is aluminum, while that of the water receiving jacket is stainless steel. This selection of materials takes into consideration the fact that it is easier to take the measures against corrosion in a case of the heat radiation pipe 4, depending on the relationship between disposition of the heat radiation pipe 4 and the heat receiving jacket 2. Much of the ions coming from rubber, etc., in the system react in the heat radiation pipe 4, therefore, it can be considered that the corrosion is suppressed in the heat receiving jacket 2.

Also, in a case where the material of the heat radiation pipe is stainless steel, while the heat receiving jacket is made of copper, in place thereof, it is preferable to cover or coat the heat receiving jacket with a waterproof sheet, etc., as well.

As another embodiment, the heat receiving jacket and the heat radiation jacket can be made of the same kind of material. In that case, it is preferable to enclose or cover a member that is greater in thickness with the waterproof sheet 8.

In a case where the heat receiving jacket 2 is disposed in the main housing 6, while the heat radiation pipe is disposed in the display device housing 7, it is preferable that the size of the heat radiation pipe 4 is smaller compared to that of the heat receiving jacket 2. Also, in order to the conduct heat produced by the heat generation body to the heat receiving jacket 2 effectively, since a certain thickness is needed for diffusing heat therein, it is preferable that the thickness of the heat radiation pipe 4 is thinner compared to that of the heat receiving jacket 2.

Corrosion tends to proceed on both the heat receiving jacket 2 and the heat radiation pipe 4. However, when the same material is used for both, it is possible to suppress metal ions flowing out from one of them from exerting an influence upon the corrosion of the other, compared to the case of combining different kinds of metals therein. For example, it is possible for both the heat receiving jacket 2 and the heat radiation pipe 4 to be made of copper. It often occurs that bacteria is mixed into the water which is used as the cooling liquid, for example, in the manufacturing process thereof. Even in such a case, the structure, having an area where the cooling liquid is in greatest contact with the copper, can suppress the corrosion accompanying with the bacteria at the portion which is in contact with the cooling liquid, thereby improving the reliability of the system as a whole.

Also, when the heat receiving jacket and the heat radiation pipe are made of the same kind of material, the size and weight thereof can be made as small and light as possible. Thus, such a technique is preferable when the system is to be applied to a personal computer that is of small size and is lightweight. In that instance, it is preferable to enclose or cover the member that is thinner in thickness with the waterproof sheet 8.

In a case where the heat radiation pipe 4 and the heat receiving jacket 2 are made of copper and aluminum, respectively, it is possible to suppress the amount of corrosion by adding corrosion inhibiter agents for copper and aluminum into the coolant in advance.

As was fully explained in the above, according to the present invention, it is possible to provide a liquid cooling system that is suitable for cooling a high heat generation body, such as a semiconductor device, etc., and to suppress ill influences following corrosion in the cooling system on the apparatus in which it is installed, thereby ensuring the dependability of the system as a whole, and a personal computer equipped with such a structure.

While we have shown and described several embodiments in accordance with our invention, it should be understood that the disclosed embodiments are susceptible to changes and modifications without departing from the scope of the invention. Therefore, we do not intend to be bound by the details shown and described herein, but intend to cover all such changes and modifications that fall within the ambit of the appended claims.

What is claimed is:

1. A liquid cooling system, comprising:
   a pump for supplying a cooling liquid;
   a heat receiving jacket being supplied with said cooling liquid and positioned to receive heat generated from a heat generation body;
   a heat radiation pipe for radiating heat which is supplied by the cooling liquid passing through said heat receiving jacket; and
   a passage for circulating the cooling liquid passing through said heat radiation pipe into said pump, wherein
   said heat radiation pipe is made of material having a corrosion resistance that is higher than that of said heat receiving jacket.

2. A liquid cooling system, as defined in the claim 1, wherein said heat receiving jacket is made of a material, mainly containing aluminum as a constituent component therein, while said heat radiation pipe is made of a stainless material.

3. A liquid cooling system, comprising:
   a pump for supplying a cooling liquid;
   a heat receiving jacket being supplied with said cooling liquid and positioned to receive heat generated from a heat generation body;
   a heat radiation pipe for radiating heat which is supplied by the cooling liquid passing through said heat receiving jacket; and
   a passage for circulating the cooling liquid passing through said heat radiation pipe into said pump, wherein:
   said heat radiation pipe is made of a material having a corrosion resistance that is higher than that of said heat receiving jacket; and
   the thickness from said cooling liquid passage up to a surface of said jacket in said heat receiving jacket is greater than the thickness from said cooling liquid passage up to a surface of said heat radiation pipe in said heat radiation pipe.

4. A liquid cooling system, as defined in claim 3, wherein said heat receiving jacket is made of a material, mainly containing one of copper and aluminum as a constituent component therein, and said heat radiation pipe also is made of a material, mainly containing one of copper, aluminum and stainless steel as a constituent component therein.

5. A personal computer, comprising:
   a semiconductor element;
   a signal input portion; and
   a display device, and further including:
   a pump for supplying a cooling liquid;
   a heat receiving jacket being supplied with said cooling liquid and positioned to receive heat generated from a heat generation body;
   a heat radiation pipe for radiating heat which is supplied by the cooling liquid passing through said heat receiving jacket; and
   a passage for circulating the cooling liquid passing through said heat radiation pipe into said pump, wherein:
   said heat radiation pipe is made of a material having a corrosion resistance that is higher than that of said heat receiving jacket.

6. A liquid cooling system, as defined in the claim 5, wherein said heat receiving jacket is made of a material, mainly containing one of copper and aluminum as a constituent component therein, and said heat radiation pipe is made of a material mainly containing one of copper, aluminum and stainless steel as a constituent component therein.

* * * * *